US006944529B2

(12) United States Patent
Person et al.

(10) Patent No.: US 6,944,529 B2
(45) Date of Patent: Sep. 13, 2005

(54) AUTOMATIC FLUID DRAINING FROM A HYDRAULIC SYSTEM COMPONENT OF AN AUTOMATIC TRANSMISSION

(75) Inventors: Dennis Person, Canton, MI (US); Lee Becker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 10/661,980

(22) Filed: Sep. 12, 2003

(65) Prior Publication Data

US 2005/0060078 A1 Mar. 17, 2005

(51) Int. Cl.[7] ................................................ F16H 61/04
(52) U.S. Cl. ............................. 701/51; 701/66; 477/34; 477/38; 477/50; 137/488; 137/487
(58) Field of Search ..................... 701/51, 66; 137/488, 137/487, 487.5; 477/34, 38, 50, 79

(56) References Cited

U.S. PATENT DOCUMENTS 3,913,453 A * 10/1975 Parquet ....................... 91/420
4,296,649 A * 10/1981 Marquart .................... 475/133
4,502,354 A * 3/1985 Suzuki et al. ............... 477/155
4,748,809 A * 6/1988 Sumiya et al. ................ 60/415
5,217,085 A * 6/1993 Barrie et al. ............. 184/104.1
5,315,901 A 5/1994 Barnes
5,318,080 A 6/1994 Viken
5,522,474 A 6/1996 Burman
5,584,370 A * 12/1996 Wakahara ................... 192/3.3
5,890,509 A * 4/1999 Becker et al. ......... 137/115.26
5,911,647 A * 6/1999 Kozaki et al. .............. 477/143
6,374,872 B1 4/2002 Tarabocchia
6,520,293 B1 2/2003 Ogawa et al.

* cited by examiner

*Primary Examiner*—Thomas G. Black
*Assistant Examiner*—Eric M. Gibson
(74) *Attorney, Agent, or Firm*—David B. Kelley; MacMillan, Sobanski & Todd

(57) ABSTRACT

In a hydraulic system for an automatic transmission, a method for automatically draining fluid from an oil cooler and related hydraulic lines when power is off to prevent fluid leakage, escape and outflow when they are disconnected from the system. A control system includes a source of relatively high pressure when power is on, an oil cooler, fluid circuit lines for supplying transmission oil to the cooler, a source of low pressure for containing fluid, such as an oil sump, and a valve hydraulically connected to the circuit, high pressure source, and low pressure source, the valve having a first state at which a hydraulic connection through the valve between the circuit and the source of low pressure is closed when power is on, and a second state at which a hydraulic connection through the valve between the circuit and the low pressure source is open when power is off.

12 Claims, 3 Drawing Sheets

AUTOMATIC FLUID DRAINING FROM A HYDRAULIC SYSTEM COMPONENT OF AN AUTOMATIC TRANSMISSION

BACKGROUND OF THE INVENTION

This invention relates to hydraulic fluid systems for a motor vehicle automatic power transmission. More particularly, it pertains to draining oil automatically from an oil cooler and fluid supply lines to a transmission sump.

Generally, automatic transmission fluid for operating and lubricating an automatic transmission is contained in an oil reservoir such as oil pan and the like located at the underside of the automatic transmission case. The automatic transmission fluid contained in the oil pan is inducted by an oil pump and is supplied to a torque converter, miscellaneous lubrication circuits, and a hydraulic control system, which produces various magnitudes of pressure and provides circuit paths between the pressure sources and the appropriate components that employ the pressure to perform their functions.

For example, the various speed ratios produced by the transmission result by selectively engaging and disengaging various friction elements, hydraulically actuated clutches and brakes. The applied and released condition of the friction elements operate to interconnect and disconnect elements of the planetary gearsets in order to produce multiple forward drive gear ratios and reverse drive. The friction elements are applied and released in response to the pressurized and vented state of a hydraulic servo through which the friction elements are actuated.

The magnitude of torque transmitted by the various friction elements in the several gear ratios is reflected in the magnitude of pressure applied to each friction element. When the magnitude of transmitted torque is high, the magnitude of actuating pressure is high. Generally, during operation in the lowest forward drive gears and reverse gear, the transmitted torque magnitude is high. A control system for an automatic transmission produces line pressure up to about 300 psi. The lubrication circuit is continually supplied with fluid during normal operation, and typically fluid is present in the cooler and its supply lines even after the pump is stopped by turning off the vehicle's engine.

Under operating conditions when the automatic transmission fluid is at its normal, elevated temperature, fluid from the control system directed to the lubrication circuits passes first through an oil cooler, a heat exchanger usually incorporated in the radiator, where an exchange of heat from the transmission fluid to ambient air or other fluid occurs. The lubrication circuits are supplied from the cooler outlet. Fluid used to lubricate various friction surfaces throughout the transmission returns by gravity to the reservoir, from which it is inducted at the pump inlet.

The cooler is connected to the transmission control system by hydraulic lines, which extend from the transmission case through hydraulic fittings, which connect the lines to the cooler. The cooler is located in the engine compartment in the vicinity of the air inlet shroud, cooling fan, and radiator. The cooler fittings are located above the fittings that connect the lines to the transmission case. The transmission oil pan or reservoir are located at an elevation that is lower than that of the cooler.

Because the cooler lines remain full when the engine is not running, whenever the transmission is disconnected from the cooler supply lines, or the lines are disconnected at the fittings from the cooler, transmission fluid contained in the cooler and lines can pour out into the service area or onto equipment in the engine compartment. To prevent this oil spillage when servicing the transmission, either a catch basin is used to hold the fluid in the lines and cooler when opening the hydraulic fittings at the cooler lines, or the fittings are immediately plugged after disconnecting the lines from the cooler.

There is a need, therefore, for a reliable, low cost technique to prevent spillage and outflow of transmission fluid in this way while servicing the transmission, radiator, or cooler.

SUMMARY OF THE INVENTION

A hydraulic system according to this invention includes an anti-drainback valve, which not only prevents drainback of both the apply and release converter circuits, but also permits the "case out" cooler line to drain into the transmission when the engine is not running. Because of the higher location of the cooler hydraulic fittings relative to that of the transmission case hydraulic fittings and reservoir, gravity is employed to move the fluid out of the cooler line into the fluid reservoir.

An anti-drain back valve according to this invention eliminates transmission fluid leakage and escape from an oil cooler and related supply lines when they are disconnected from the transmission. The valve also maintains the torque converter filled with fluid after power is turned off so that there is no delay in providing the torque converter function after starting the engine. Otherwise, time would be required to refill the torque converter with fluid after the engine is restarted and before the torque converter is able to assist in vehicle launch by amplifying the torque produced by the engine.

In a hydraulic system for an automatic transmission, a method according to this invention permits unobstructed fluid flow to the cooler when power is on, but it eliminates fluid leakage from the oil cooler and related hydraulic lines when they are mechanically disconnected from the system when power is off. Loss of fluid by spilling and leaking is avoided automatically by draining fluid from the cooler and its supply lines when power is off. To accomplishing this result, a control system includes a source of relatively high pressure when power is on, an oil cooler, fluid circuit lines for supplying transmission oil to the cooler, a fluid reservoir for containing fluid at relatively low pressure, and a valve hydraulically connected to the circuit, high pressure source, and reservoir. The valve has a first state at which a hydraulic connection through the valve between the circuit and the source of low pressure is closed when power and the high pressure source are on, and a second state at which a hydraulic connection through the valve between the circuit and the low pressure reservoir is open when power is off.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
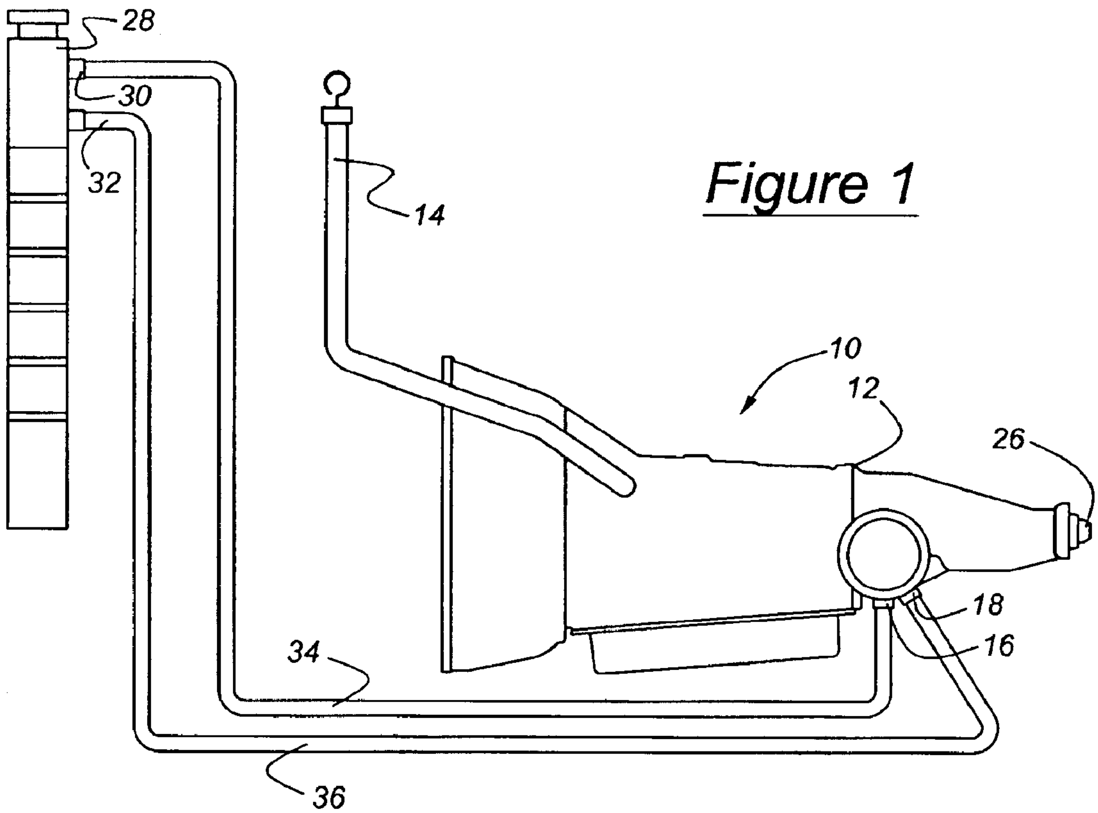
FIG. 1 is a side elevation view of a automatic transmission, oil cooler, and hydraulic lines connecting the cooler and transmission.
Figure 2:
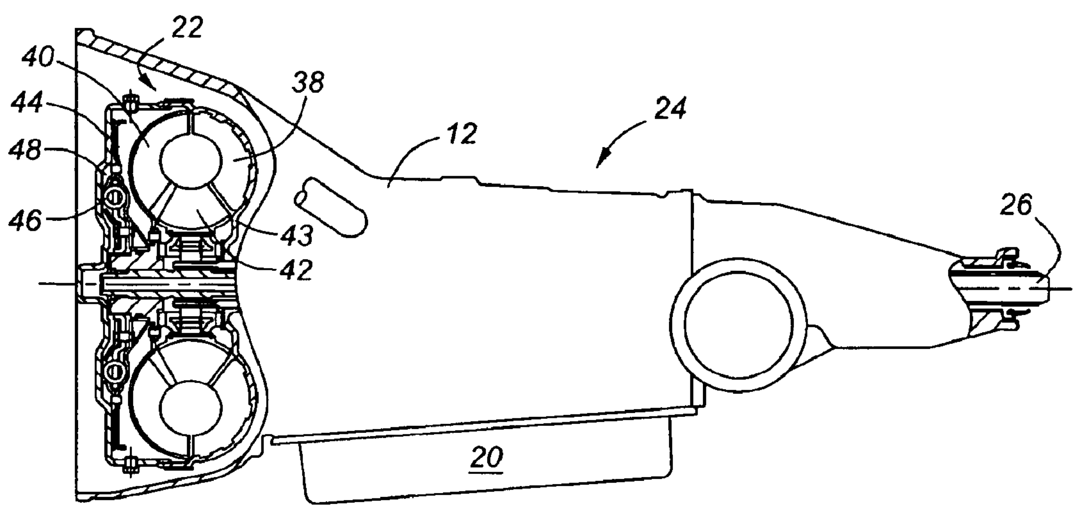
FIG. 2 is a side elevation view, partially in cross section, showing an automatic transmission to which this invention can be applied.

Referring first to FIG. 1, an automatic transmission 10 includes a case 12, a transmission fluid filler tube 14, fluid outlet 16, fluid inlet 18, fluid reservoir or oil pan 20 located below the case, a torque converter 22, gearing 24 and an output shaft 26. The fluid outlet and inlets 16, 18 are used to circulate fluid under pressure from within the transmission to an oil cooler 28, which extracts heat from the transmission fluid circulating in the cooler. Heat from the transmission fluid can be exchanged in the cooler by convection to air passing at high speed between fins radiating from the lines that carry the fluid through the cooler and by conduction to surrounding fluid. This heat exchange occurs in a section of a radiator having an inlet at fitting 30 and an outlet at fitting 32. The cooler inlet 30 is directly connected to fluid outlet 16 through a suitable tubular hydraulic line 34. Similarly, the cooler outlet 32 is connected to fluid inlet 18 through a tubular hydraulic line 36.

The torque converter 22 includes a bladed impeller wheel 38 driven by an engine (not shown). A bladed turbine 40, arranged in toroidal fluid flow relationship with respect to the impeller 38, is driven hydrokinetically by the impeller and is driveably connected to the gearing 24. A bladed stator wheel 42, mounted on an overrunning brake 43, makes it possible for hydrokinetic torque multiplication to occur in the converter 22.

A lockup or bypass clutch 44, which has a spring damper 46, establishes a direct mechanical connection between impeller 38 and turbine 40 when clutch 44 is engaged, thereby bypassing the hydrokinetic drive connection between the impeller and turbine that is present when bypass clutch 44 is disengaged. The torque converter is supplied with fluid at converter apply pressure by a hydraulic control system located in the transmission. Transmission fluid fills the toroidal cavity and causes clutch 44 to frictionally engage. However, clutch 44 is disengaged when fluid at converter release pressure is supplied to the space 48 between the friction surfaces of the clutch by hydraulic control system. Converter release pressure in space 48 forces the friction surface of clutch 44 apart disengaging the clutch.

The engine drives a positive displacement, duocentric pump 50. A control body 52 and pump body, containing various hydraulic control valves and fluid passages, surrounds the pump 50. The pump 50 includes an internal rotor gear 54 supported rotatably, the rotor having nine exterior teeth. An external stator gear 56 having ten internal teeth or lobes meshes with the internal rotor and is fixed to the pump cover. The impeller 38 and internal pump rotor 54 rotate at the speed of the engine shaft. Spaces between the meshing teeth of the internal rotor 54 and pump stator 56 are pumping chambers in which fluid travels about the axis of the pump from the inlet of the pump to the outlet. Fluid in those spaces is compressed as the volume of the spaces decreases from the inlet to the outlet due to rotation of the rotor within the stator. Pump 50 is supplied with fluid from an oil sump or reservoir 20, 58 through a suction filter 60, and with fluid contained in a passage 62 leading to the pump inlet from a main regulator valve 64.

The magnitude of line pressure is controlled at regulator valve 64. Regulated line pressure in passage 66 is connected through port 68 with the chamber 74 of an anti-drain back valve 70, which includes a spool 72 formed with lands 78, 80. A compression spring 76 forces spool 72 downward within the chamber against the effect of a pressure force produced by line pressure on the lower surface of land 78. A converter release port 82 and a converter apply port 84 communicate with chamber 74. Converter apply port 84 is connected through passage 86, valve 64, passage 88, and converter clutch control valve 90 to a source of converter apply pressure 92. Similarly, converter release port 82 is connected sequentially through passage 92, converter pressure limit valve 94, passage 96, valve 90, and passage 98 to a source of converter release pressure 100.

Cooler bypass valve 102 includes a spool 104 that is movable within a chamber 106 due to the force of a compression spring 108, which biases the spool upward against the stem 110 of a thermostat 111, which senses and responds to the temperature of the transmission fluid. When the temperature of the hydraulic fluid is elevated to its normal temperature range, stem 110 is extended to the position shown in FIG. 3, and land 112 closes or blocks a connection through valve 102 between an inlet port 116 and outlet port 114. Outlet port 114 is connected through passage 118 to lubrication fluid connections 120 and 138.

Cooler bypass valve 102 need not contain a thermostat. Instead, any valve that changes its state as the temperature of hydraulic fluid in the system changes can be substituted for a cooler bypass valve having a thermostat. The change of state that occurs is such that a hydraulic passage through the valve closes when fluid temperature is equal to or greater than a predetermined temperature, and the hydraulic passage through the valve opens when fluid temperature is less than the predetermined temperature. For example, when the fluid temperature is equal to or less than 158° F., the stem 110 of valve 102 is fully retracted and the valve is in the position of FIG. 4, where a connection between ports 114 and 116 through valve 102 is fully open. When the fluid temperature increases to 185° F., the stem 110 of valve 102 extends to the position of FIG. 3, where a connection between ports 114 and 116 through valve 102 is fully closed. When the fluid temperature is between 158° F. and 185° F., valve 102 partially closes the connection between ports 114 and 116 through valve 102. A normal operating temperature range for automatic transmission fluid is 180° F.–200° F.

When the temperature of the transmission fluid is relatively low, i.e., below its normal operating range, stem 110 retracts into the thermostat 111, to the position shown in FIG. 4, and spool 104 moves upward in the valve chamber due to the force of spring 108, permitting land 112 to open a connection between inlet port 116 and outlet port 114. Passages 122 and 124 connect inlet port 116 to a case outlet port 126.

Supply line 34 connects port 126 to the oil cooler 28 and to a pressure-side filter 132, arranged in parallel with cooler 28. Fluid passing through the cooler 28 and filter 132 enters a rear lube circuit 134, a center lube circuit 136, and a front lube circuit 138. The lubrication circuits, which are located within transmission case 12, supply lubricant to friction surfaces on various shafts, bearings and journal surfaces of the transmission. Lubrication fluid returns by gravity to the oil pan or reservoir 20, 58 after exiting the lubrication circuits.

Figure 3:
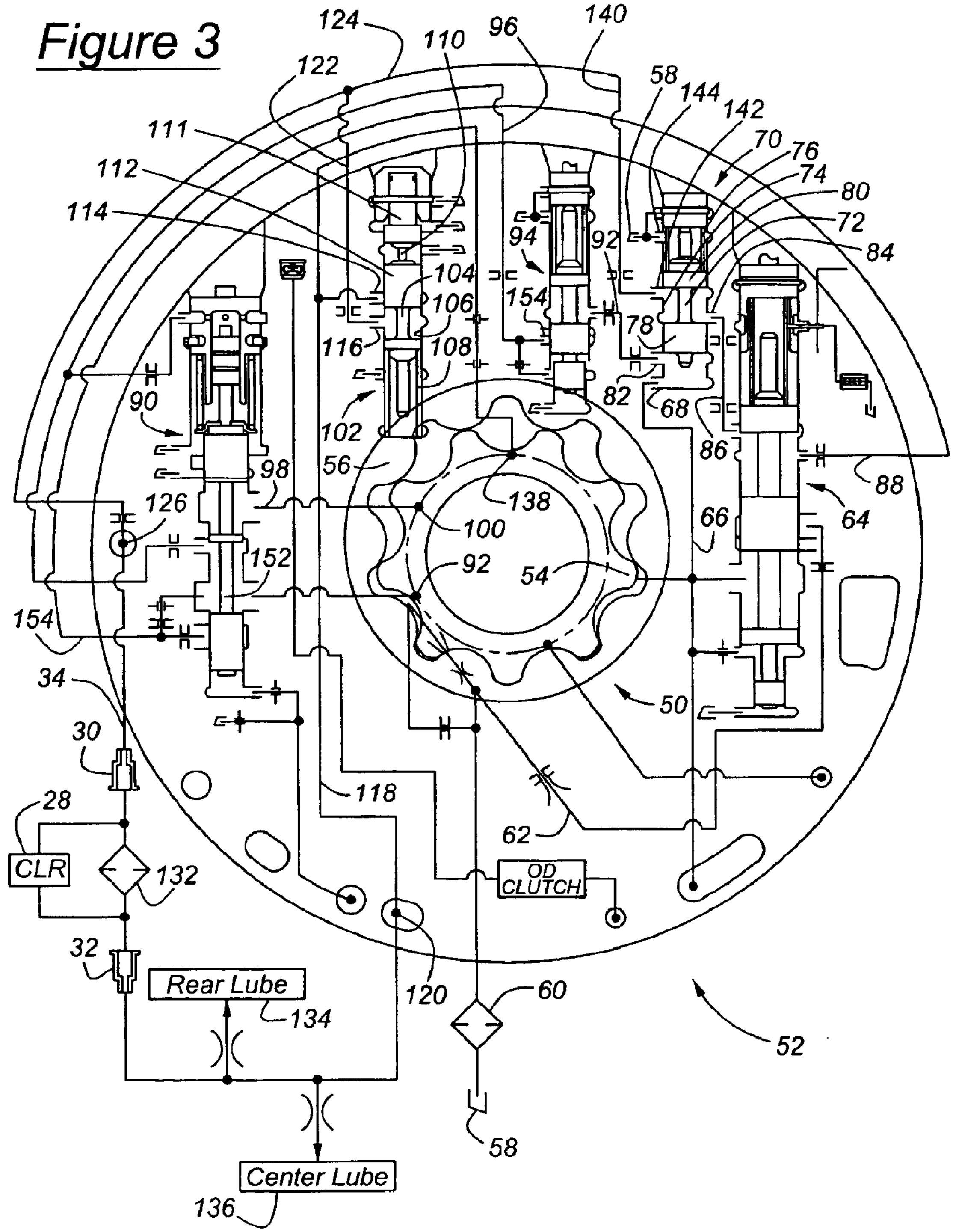
FIG. 3 is a schematic diagram of a hydraulic system showing certain valves in a power-on position.

In operation, the spool of valve 70 is in the position shown in FIG. 3 when power is on, i.e., when the engine is running and regulated line pressure is supplied to the hydraulic system. The spools of valves 90, 94 can be in various positions controlled by external commands when the engine is running. The thermostat 111 moves spool 104 to the position shown in FIG. 3 when the oil temperature is greater than a thermostat switch temperature. When the engine is turned off, the spools of those valves 70, 90, and 94 move to the bottom of the corresponding valve chamber, to the positions shown in FIG. 4. Spool 104 returns to the position shown in FIG. 4 as the thermostat and fluid cool.

When the engine is running and the transmission oil temperature is relatively high, lubrication fluid is supplied to the cooler 28 and filter 132 from the converter apply source 92. The path between the converter apply source 92 to the cooler 28 and filter 132 includes sequentially valve 152, passages 154, 88, valve 64, passage 86 valve 70, passages 140, 124, case out port 16, 126, and fitting 30. Lube fluid leaving the cooler and filter is delivered to the lube circuits 134, 136, 138. The connection to front lube circuit 138 is made through lube port 120 and passage 118. A connection between ports 114 and 116 through the cooler bypass valve 120 is closed by land 112.

When the engine is running and the transmission oil temperature is relatively low, lubrication fluid is supplied to the cooler 28 and filter 132 from the converter apply source 92 through the path described above. A lubrication fluid path, parallel to the path that supplies cooler 28 and filter 132, is opened between ports 114 and 116 through the cooler bypass valve 102. The flow rate of lubrication fluid through the cooler and filter is low due to the high viscosity of the transmission oil at low temperature. Lubrication fluid exiting case out port 142 of the anti-drain back valve 70 enters cooler bypass valve 102 through passages 124, 122 and port 116, exits valve 102 through port 114, and flows to the lubrication circuits 134, 136, 138.

When power is off, i.e. when the engine and pump 50 are stopped, spool 72 of the converter anti-drain back valve 70 moves downward within its chamber due to the force of spring 76. This movement causes land 80 to open a connection between oil cooler 28 through line 34, passages 124, 140, and port 142 to the fluid reservoir 20, 58. Exhaust port 144 connects port 142 through the valve chamber 74 to the fluid reservoir 20, 58. In this way, lubrication fluid contained in the cooler supply line 34, as well as any fluid contained in the cooler 28 at an elevation above the cooler fittings 30, 32 returns through valve 70 to the oil reservoir 20, 58 because the cooler fittings and the line 34 are located at a higher elevation than that of the oil pan and fluid reservoir 20, 58.

Figure 4:
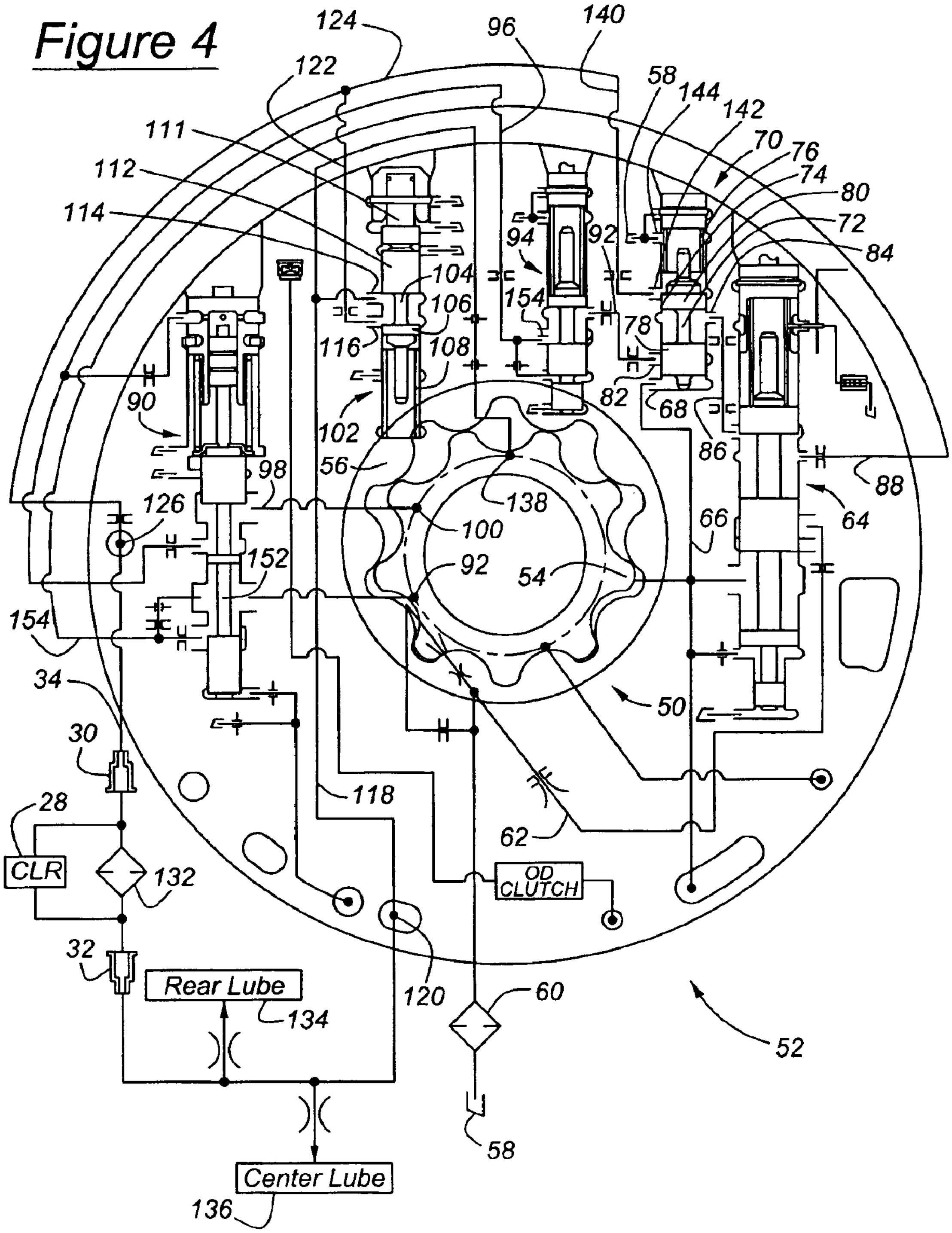
FIG. 4 is a schematic diagram of the hydraulic system of FIG. 3 showing certain valves in a power-off position.

When power is off, the spool 152 of converter clutch control valve 90 moves downward within its chamber to the position of FIG. 4, thereby opening a connection between the converter release source 100 and port 82 of the anti-drain back valve 70. The path from converter release source 100 to port 82 includes passage 98, valve 90, passage 96, port 154, valve 94, and passage 92. However, port 82 of the anti-drain back valve 70 is blocked by land 78, preventing flow from the torque converter release circuit when the engine is off.

Similarly, when power is off, valve 90 opens a connection between the converter apply pressure source 92 and port 84 of the anti-drain-back valve 70. This connection is made through valve 90, passages 154, 88, valve 64, and passage 86. However, when power is off, lands 80 and 78 close port 84 from communication with other portions of the system, thereby preventing flow from the torque converter apply circuit when the engine is off. In this way, the torque converter is maintained full of hydraulic fluid in the power-off condition. This feature avoids any delay in producing torque multiplication by torque converter upon starting the engine and launching the vehicle from a stopped position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

We claim:

1. A hydraulic system of an automatic transmission for draining fluid from a portion of the hydraulic system, comprising:

- a fluid source for supplying fluid to the system;
- an oil cooler through which hydraulic fluid flows;
- a circuit hydraulically connecting the fluid source to the oil cooler;
- a reservoir for containing fluid at relatively low pressure; and
- a valve hydraulically connected by the circuit to the oil cooler, the fluid source and the reservoir, the valve having a first state at which a hydraulic connection through the valve between the fluid source and the reservoir is closed, and a hydraulic connection between the oil cooler and the reservoir is open, and a second state at which a hydraulic connection through the valve between the oil cooler and the fluid source is open.

2. The system of claim 1, wherein the valve further comprises:

- a chamber hydraulically connected to the circuit, the fluid source, and the reservoir through mutually spaced ports in the chamber;
- a spool moveable in the chamber, including a first land on which a pressure force tending to move the spool to the first state is produced in response to fluid pressure, and a second land for opening and closing communication between the component and the reservoir as the spool moves in the chamber; and
- a spring for biasing the spool to the second state in opposition to the pressure force.

3. The system of claim 1, further comprising:

- a lubrication circuit hydraulically connected to the oil cooler; and a second valve hydraulically connected to the fluid source and the lubrication circuit, disposed in parallel flow relation with the oil cooler, for alternately opening and closing a connection between the fluid source and the lubrication circuit through the second valve in response to a temperature of the fluid.

4. The system of claim 1, further comprising:

a lubrication circuit hydraulically connected to the circuit; and a second valve hydraulically connected to the fluid source and the lubrication circuit, disposed in parallel flow relation with the oil cooler, for closing a connection between the fluid source and the lubrication circuit through the second valve when a temperature of the fluid is equal to or greater than a predetermined temperature, and for opening the connection between the fluid source and the lubrication circuit through the second valve when the temperature of the fluid is less than the predetermined temperature.

5. The system of claim 1, further comprises:

a lubrication circuit hydraulically connected to the circuit;

a second valve hydraulically connected to the fluid source and the lubrication circuit, disposed in parallel flow relation with the oil cooler, for alternately opening and closing a connection between the fluid source and the lubrication circuit through the second valve in response to a temperature of the fluid;

a torque converter including a bladed impeller wheel and a bladed turbine wheel hydrokinetically coupled to the impeller;

wherein the fluid source is a source of converter apply pressure for supplying pressurized fluid to the torque converter;

a first hydraulic path connecting the valve and the source of converter apply pressure; and wherein the second valve closes the first hydraulic path against the passage of fluid from the torque converter when a temperature of the fluid is equal to or less than a predetermined temperature.

6. The system of claim 1, further comprising:

a lubrication circuit hydraulically connected to the circuit;

a second valve hydraulically connected to the fluid source and the lubrication circuit, disposed in parallel flow relation with the oil cooler, for alternately opening and closing a connection between the fluid source and the lubrication circuit through the second valve in response to a temperature of the fluid;

a torque converter including a bladed impeller wheel, a bladed turbine wheel hydrokinetically coupled to the impeller, and a bypass clutch that is engaged and disengaged in response to the differential pressure across the bypass clutch;

wherein the fluid source is a source of converter apply pressure for supplying pressurized fluid to the torque converter tending to engage the bypass clutch, and a source of converter release pressure supplied to the torque converter tending to disengage the bypass clutch;

a first hydraulic path connecting the valve and the source of converter apply pressure;

a second hydraulic path connecting the valve and the source of converter release pressure; and wherein the second valve closes the first hydraulic path and second hydraulic path against the passage of fluid from the torque converter when a temperature of the fluid is equal to or less than a predetermined temperature.

7. A hydraulic system for an automatic transmission of a motor vehicle having a power source, for draining fluid from a component hydraulically connected to the system, comprising:

a fluid source supplying pressurized fluid to the system when the power source is operating;

a reservoir located at a first elevation, for containing fluid at relatively low pressure;

an oil cooler located at a higher elevation than the first elevation;

a circuit hydraulically connecting the fluid source to the cooler; and a valve hydraulically connected by the circuit to the cooler, the fluid source, and the reservoir, the valve having a first state at which first state a hydraulic connection through the valve between the fluid source and the reservoir is closed, and a hydraulic connection between the oil cooler and the reservoir is open, and a second state at which second state a hydraulic connection through the valve between the cooler and the fluid source is open.

8. The system of claim 7, wherein the valve further comprises:

a chamber hydraulically connected to the circuit, the fluid source, and the reservoir through mutually spaced ports in the chamber;

a spool moveable in the chamber, including a first land on which a pressure force tending to move the spool to the first state is produced in response to fluid pressure, and a second land for opening and closing communication between the cooler and the reservoir as the spool moves in the chamber; and a spring for biasing the spool to the second state in opposition to the pressure force.

9. The system of claim 7, further comprising:

a lubrication circuit hydraulically connected to the oil cooler; and a second valve hydraulically connected to the fluid source and the lubrication circuit, disposed in parallel flow relation with the cooler, for alternately opening and closing a connection between the fluid source and the lubrication circuit through the second valve in response to a temperature of the fluid.

10. The system of claim 7, further comprising:

a lubrication circuit hydraulically connected to the circuit; and a second valve hydraulically connected to the fluid source and the lubrication circuit, disposed in parallel flow relation with the cooler, for closing a connection between the fluid source and the lubrication circuit through the second valve when a temperature of the fluid is equal to or greater than a predetermined temperature, and for opening the connection between the fluid source and the lubrication circuit through the second valve when the temperature of the fluid is less than the predetermined temperature.

11. The system of claim 7, further comprising:

a lubrication circuit hydraulically connected to the circuit;

a second valve hydraulically connected to the fluid source and the lubrication circuit, disposed in parallel flow relation with the oil cooler, for alternately opening and closing a connection between the fluid source and the lubrication circuit through the second valve in response to a temperature of the fluid;

a torque converter including a bladed impeller wheel and a bladed turbine wheel hydrokinetically coupled to the impeller;

wherein the fluid source is a source of converter apply pressure for supplying pressurized fluid to the torque converter;

a first hydraulic path connecting the valve and the source of converter apply pressure; and wherein the second valve closes the first hydraulic path against the passage of fluid from the torque converter when a temperature of the fluid is equal to or less than a predetermined temperature.

12. The system of claim 7, further comprising:

a lubrication circuit hydraulically connected to the circuit;

a second valve hydraulically connected to the fluid source and the lubrication circuit, disposed in parallel flow relation with the oil cooler, for alternately opening and closing a connection between the fluid source and the lubrication circuit through the second valve in response to a temperature of the fluid;

a torque converter including a bladed impeller wheel, a bladed turbine wheel hydrokinetically coupled to the impeller, and bypass clutch that is engaged and disengaged in response to the differential pressure across the bypass clutch;

wherein the fluid source is a source of converter apply pressure for supplying pressurized fluid to the torque converter tending to engage the bypass clutch and a source of converter release pressure supplied to the torque converter tending to disengage the bypass clutch;

a first hydraulic path connecting the valve and the source of converter apply pressure;

a second hydraulic path connecting the valve and the source of converter release pressure; and wherein the second valve closes the first hydraulic path and second hydraulic path against the passage of fluid from the torque converter when a temperature of the fluid is equal to or greater than a predetermined temperature.

* * * * *